US012661731B2

(12) United States Patent
 Ivkovich et al.

(10) Patent No.: US 12,661,731 B2
(45) Date of Patent: Jun. 23, 2026

(54) SYSTEMS AND METHODS TO DESIGN PART WELD PROCESSES

(71) Applicant: ILLINOIS TOOL WORKS INC., Glenview, IL (US)

(72) Inventors: Stephen Ivkovich, East Lansing, MI (US); Leland Falde, Jackson, MI (US); Vincent Romano, Pinckney, MI (US); Adam Pliska, Neenah, WI (US); Todd McEllis, Jackson, MI (US); Ben Buhr, Green Bay, WI (US)

(73) Assignee: Illinois Tool Works Inc., Glenview, IL (US)

( * ) Notice: Subject to any disclaimer, the term of this patent is extended or adjusted under 35 U.S.C. 154(b) by 17 days.

(21) Appl. No.: 18/416,503

(22) Filed: Jan. 18, 2024

(65) Prior Publication Data

US 2024/0227053 A1    Jul. 11, 2024

Related U.S. Application Data

(63) Continuation of application No. 16/669,173, filed on Oct. 30, 2019, now Pat. No. 11,883,909.

(60) Provisional application No. 62/753,891, filed on Oct. 31, 2018.

(51) Int. Cl.
| | |
|---|---|
| B23K 9/095 | (2006.01) |
| B23K 9/10 | (2006.01) |
| B23K 9/32 | (2006.01) |
| B23K 31/12 | (2006.01) |
| G06V 10/40 | (2022.01) |

(52) U.S. Cl.
CPC .......... B23K 9/0953 (2013.01); B23K 9/0956 (2013.01); B23K 9/1062 (2013.01); B23K 9/32 (2013.01); B23K 31/125 (2013.01); G06V 10/40 (2022.01)

(58) Field of Classification Search
None
See application file for complete search history.

(56) References Cited

U.S. PATENT DOCUMENTS

| | | | | |
|---|---|---|---|---|
| 2016/0250706 A1* | 9/2016 | Beeson | ................... | A61F 9/064 |
| | | | | 434/234 |
| 2016/0250723 A1* | 9/2016 | Albrecht | .............. | B23K 9/0956 |
| | | | | 228/9 |
| 2016/0267806 A1* | 9/2016 | Hsu | ...................... | B23K 9/0956 |
| 2018/0126476 A1* | 5/2018 | Meess | .................. | G05B 19/182 |

* cited by examiner

*Primary Examiner* — John J Norton
(74) *Attorney, Agent, or Firm* — McAndrews, Held & Malloy, Ltd.

(57) ABSTRACT

Systems and methods to design part weld processes are disclosed. An example system for monitoring welding of components of a workpiece with multiple arc welds in a fixture includes: one or more weld sensors configured to collect data associated with the multiple arc welds; and a computing device configured to: access a weld program; provide weld instructions defined in the weld program and associated with a sequence of welds for the workpiece, the weld instructions comprising a visual slide including an image of the workpiece and a visual indication of a first location of a first weld; based on the weld program, display the visual slide at a first zoom level; based on the weld program, display the visual slide at a second zoom level; and monitor first weld data from the one or more sensors during a first weld to determine a status of the first weld.

20 Claims, 11 Drawing Sheets

700

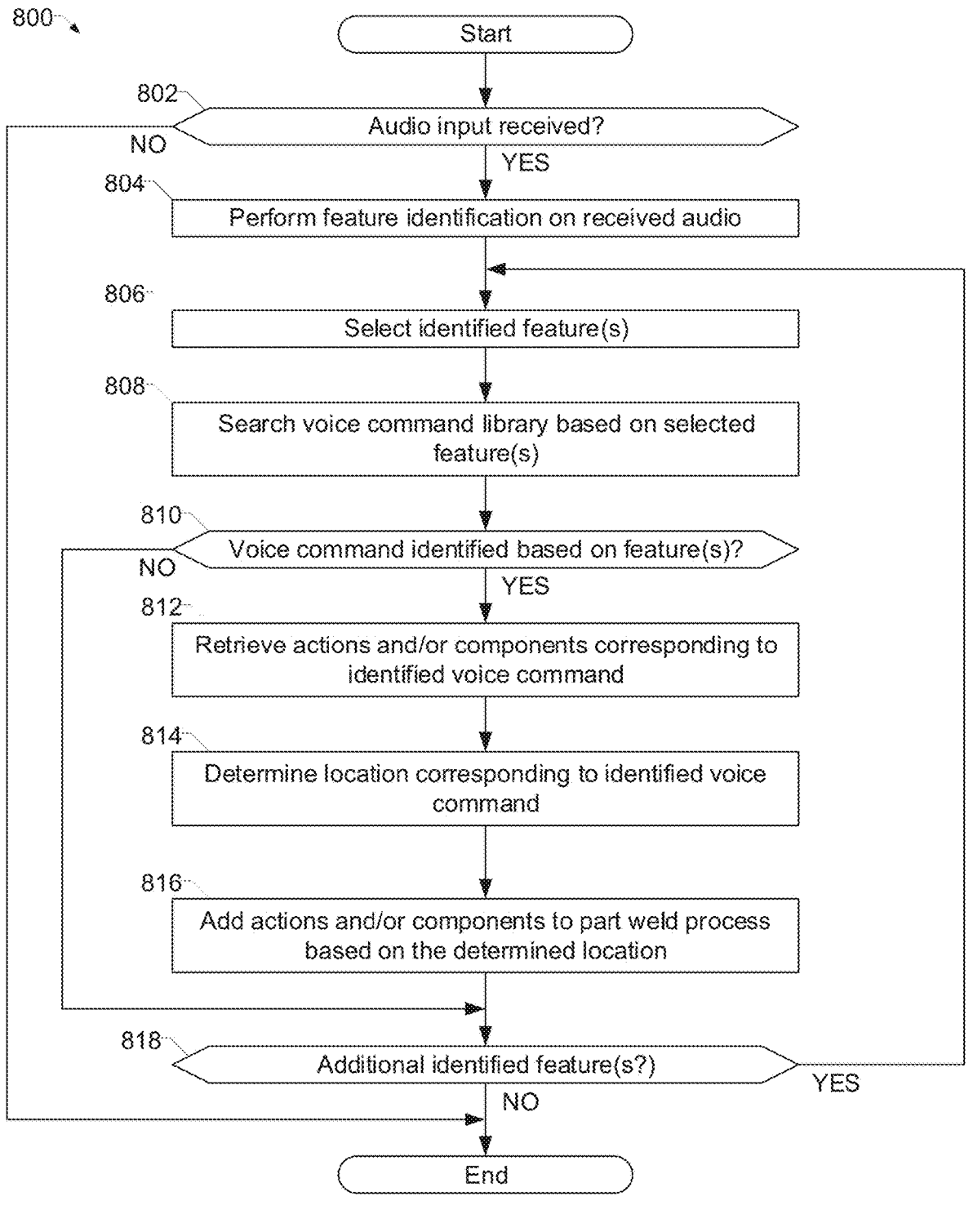

800

Start

802  Audio input received?

NO  YES

804  Perform feature identification on received audio

806  Select identified feature(s)

808  Search voice command library based on selected feature(s)

810  Voice command identified based on feature(s)?

NO  YES

812  Retrieve actions and/or components corresponding to identified voice command 814  Determine location corresponding to identified voice command 816  Add actions and/or components to part weld process based on the determined location 818  Additional identified feature(s?)

NO  YES

End

FIG. 8

SYSTEMS AND METHODS TO DESIGN PART WELD PROCESSES

RELATED APPLICATIONS

This patent claims priority to U.S. Non-Provisional patent application Ser. No. 16/669,173, filed Oct. 30, 2019, entitled "SYSTEMS AND METHODS TO DESIGN PART WELD PROCESSES," which claims the priority to and the benefit of U.S. Provisional Patent Application Ser. No. 62/753,891, filed Oct. 31, 2018, entitled "SYSTEMS AND METHODS TO DESIGN PART WELD PROCESSES" all of which are hereby incorporated by reference in their entirety for all purposes.

FIELD OF THE DISCLOSURE

This disclosure relates generally to welding, and more particularly, to systems and methods to design part weld processes.

BACKGROUND

Many high volume, complex welded assemblies are produced using manual or semi-automated production welders. The repetitive nature of these welding operations and the high production rates that are required eventually lead to welder fatigue. Therefore, missing or defective welds on these welded assemblies is a quality assurance problem.

To identify defective welds, sensors that measure current, wire feed, voltage, and gas flow are used to enable the quality of a weld to be determined. The information produced by the sensors allows defective welds or welds of a quality less than a pre-determined quality to be identified.

SUMMARY

Systems and methods to design part weld processes are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 is a flowchart representative of example machine readable instructions which may be executed to generate weld instructions and/or other aspects of a part weld process using voice command recognition.

The figures are not necessarily to scale. Wherever appropriate, similar or identical reference numerals are used to refer to similar or identical components.

DETAILED DESCRIPTION

Figure 1:
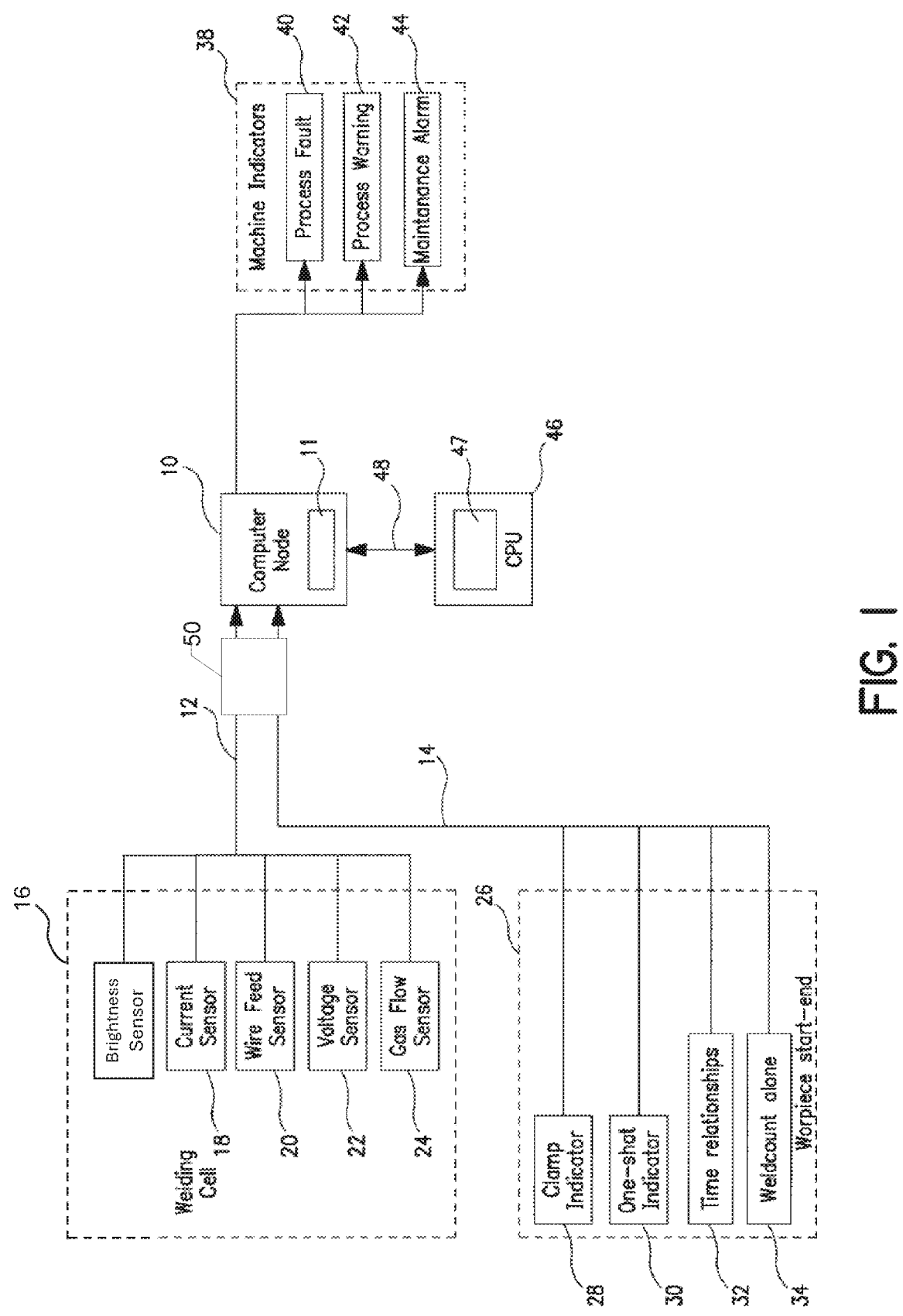
FIG. 1 is a schematic diagram of an example system to provide arc-weld monitoring with part-tracking system, in accordance with aspects of this disclosure.

Disclosed systems and methods provide improved weld monitoring and part-tracking to manufacturing systems by improving the ease and flexibility with which a part weld process designer can specify weld instructions and part result tracking. Disclosed examples enable a designer to quickly create visual part weld process instructions for use by a weld operator, including enforcing predefined and/or custom design rules.

Disclosed example part weld processes involve a defined process that describes the steps and/or methods necessary to complete a unit of work. Disclosed example part weld processes enable easy and intuitive design of part weld processes for subsequent use by weld operators. Example systems and methods for part weld process design involve enforcing system-generated and/or operator-defined rules during one or more steps of the design process.

Disclosed example systems for monitoring welding of components of a workpiece with multiple arc welds in a fixture include: one or more weld sensors configured to collect data associated with the multiple arc welds; a data collection device configured to monitor the one or more weld sensors; and a computing device storing a weld program, the computing device configured to: provide weld instructions defined in the weld program and associated with a sequence of welds for the workpiece; monitor an interface with the data collection device to detect an event defined in the weld program based on a state of the interface; and, in response to detecting the event, taking one or more actions defined in the weld program.

In some examples, the data collection device includes at least one of an arc monitoring device or a welding power supply. In some examples, the weld instructions indicate a position of a first weld on the workpiece and weld information for the weld. In some example systems, the computing device is configured to: monitor first weld data from the data collection device or from the one or more sensors during the first weld, wherein the first weld data includes a quality of the first weld; associate the first weld data of the first weld with predetermined weld data by matching a weld number for the first weld of the sequence of welds for the workpiece from the weld data with a number in the weld instructions; and compare the quality of the weld in the first weld data to the weld information for the weld in the weld instructions.

Disclosed example systems for monitoring welding of components of a workpiece with multiple arc welds in a fixture include: one or more weld sensors configured to collect data associated with the multiple arc welds; and a computing device configured to: access a weld program; provide weld instructions defined in the weld program and associated with a sequence of welds for the workpiece, the weld instructions comprising a visual slide including an image of the workpiece and a visual indication of a first location of a first weld on the workpiece; based on the weld program, display the visual slide at a first zoom level; based on the weld program, display the visual slide at a second zoom level different than the first zoom level; and monitor first weld data from the one or more sensors during a first weld to determine a status of the first weld.

In some example systems, the second zoom level is more zoomed in than the first zoom level and is based on the visual indication of the first location of the first weld within the visual slide. In some examples, the weld instructions further include a visual indication of a second location of a second weld on the workpiece, and the computing device is further configured to, based on the weld program, display the visual slide at a third zoom level based on the visual indication of the second location of the second weld within the visual slide.

In some examples, the computing device is configured to, based on the weld program, zoom out from the second zoom level to the first zoom level prior to zooming from the first zoom level to the third zoom level. In some examples, the first, second, and third zoom levels are predefined or dynamically determined based on the weld instructions.

In some examples, the second zoom level is more zoomed in than the first zoom level and is defined in the weld program as a portion of the visual slide. In some example systems, the second zoom level is based on a boundary of the visual slide. In some example systems, the second zoom level is based on locations of a specified set of elements within the visual slide, such that the second zoom level includes all of the specified set of elements. In some examples, the computing device is configured to determine whether a first one of the weld instructions includes a zoom instruction. In some examples, the weld instructions are associated with the first zoom level and the second zoom level via metadata or properties associated with the weld instructions.

Some disclosed example non-transitory machine readable medium include machine readable instructions which, when executed, cause a processor to: access a weld program; provide weld instructions defined in the weld program and associated with a sequence of welds for a workpiece, the weld instructions comprising a visual slide including an image of the workpiece and a visual indication of a first location of a first weld on the workpiece; based on the weld program, display the visual slide at a first zoom level via a display; based on the weld program, display the visual slide at a second zoom level different than the first zoom level via the display; and monitor weld data from the one or more sensors during a first weld to determine a status of the first weld.

In some examples, the second zoom level is more zoomed in than the first zoom level and is based on the visual indication of the first location of the first weld within the visual slide. In some examples, the weld instructions further include a visual indication of a second location of a second weld on the workpiece, and the machine readable instructions are configured to cause the processor to, based on the weld program, display the visual slide at a third zoom level based on the visual indication of the second location of the second weld within the visual slide.

In some examples, the machine readable instructions are configured to cause the processor to, based on the weld program, zoom out from the second zoom level to the first zoom level prior to zooming from the first zoom level to the third zoom level. In some examples, the first, second, and third zoom levels are predefined or dynamically determined based on the weld instructions.

In some examples, the second zoom level is more zoomed in than the first zoom level and is defined in the weld program as a portion of the visual slide. In some examples, the second zoom level is based on a boundary of the visual slide. In some examples, the second zoom level is based on locations of a specified set of elements within the visual slide, such that the second zoom level includes all of the specified set of elements. In some examples, the machine readable instructions are configured to cause the processor to determine whether a first one of the weld instructions includes a zoom instruction. In some examples, the weld instructions are associated with the first zoom level and the second zoom level via metadata or properties associated with the weld instructions.

FIG. 1 is a block diagram that illustrates an example arc-weld monitoring with part-tracking system 100. The system 100 operates a network including one or more computing devices operably connected by a network to one or more central computing systems 46. Each computing device 10 receives sensor inputs 12 and digital inputs 14 from welding cell 16 in which one or more welds is being applied to a workpiece. Each computing device 10 can display real-time information concerning a weld on text display screen 11. Example sensor inputs 12 include weld status information provided by a current sensor 18, a wire feed sensor 20, a voltage sensor 22, and/or a gas flow sensor 24. Example digital inputs 14 include information related to starts and/or ends of a workpiece (e.g., workpiece start-end 26), which may include a clamp indicator 28 and/or a one-shot indicator 30. Additionally or alternatively, the workpiece start-end 26 may be programmed into the computing device 10 and include time relationships 32 and/or weld count 34 alone.

The example computing device 10 processes sensor input 12 and/or digital input 14, and generates one or more digital outputs 36. Example digital outputs 36 include machine indicators 38 such as a process fault 40, a process warning 42, and/or maintenance alarms 44. The digital output 36, which indicates the status of the weld just completed and the requirements for the next weld to be made, can be provided to the operator (e.g., welder) who is welding the workpiece and/or to a system operator for monitoring an automated welding operation. In some examples, when a weld is determined to be defective, the digital output 36 causes the welding operation to stop, which allows the defective weld to be repaired or the workpiece with the defective weld to be discarded. The example computing device 10 tracks sensor input 12 and digital input 14 for each weld of a plurality of welds in the workpiece (e.g., a part) and status determination(s) made for each weld of the part.

The central computing system 46 includes a display 47 and is operatively connected 48 to the computing device(s) 10. The central computing system 46 operates the computer program that is used to configure the computing device(s) 10 for particular welding operation(s) and/or to receive the information from the computing device 10 for data logging, further weld analysis, statistical process control (SPC), and/or part-tracking. The computing system 46 can be connected to a plurality of computer nodes for monitoring welding operations in a plurality of welding cells by means of a computer network (not shown). The example computing system 46 performs part-tracking by receiving and storing information related to the welding operations from the various computing devices. After performance of welds and capture of weld information by the computing device(s) 10, the example computing system 46 may receive the weld information from the computing device(s) 10 and/or display the weld information on the display 47.

As described in more detail below, the example central computing system 46 and/or the computing device(s) 10 may include one or more computers, servers, workstations, and/or any other type of computing system, and may enable administrators, weld engineers, and/or other personnel to design the weld instructions that are to be displayed in or near the weld cell 16 (e.g., via the computing device 10) and performed by the weld operators. Disclosed examples enable easier part weld process design via user interfaces, including dragging and dropping weld components or instructions from a library onto a slide to create weld instructions, defining events and/or weld instructions in response to events, enforcing rules during part weld process design, and/or defining slide masters for use in creating multiple slides.

Figure 2:
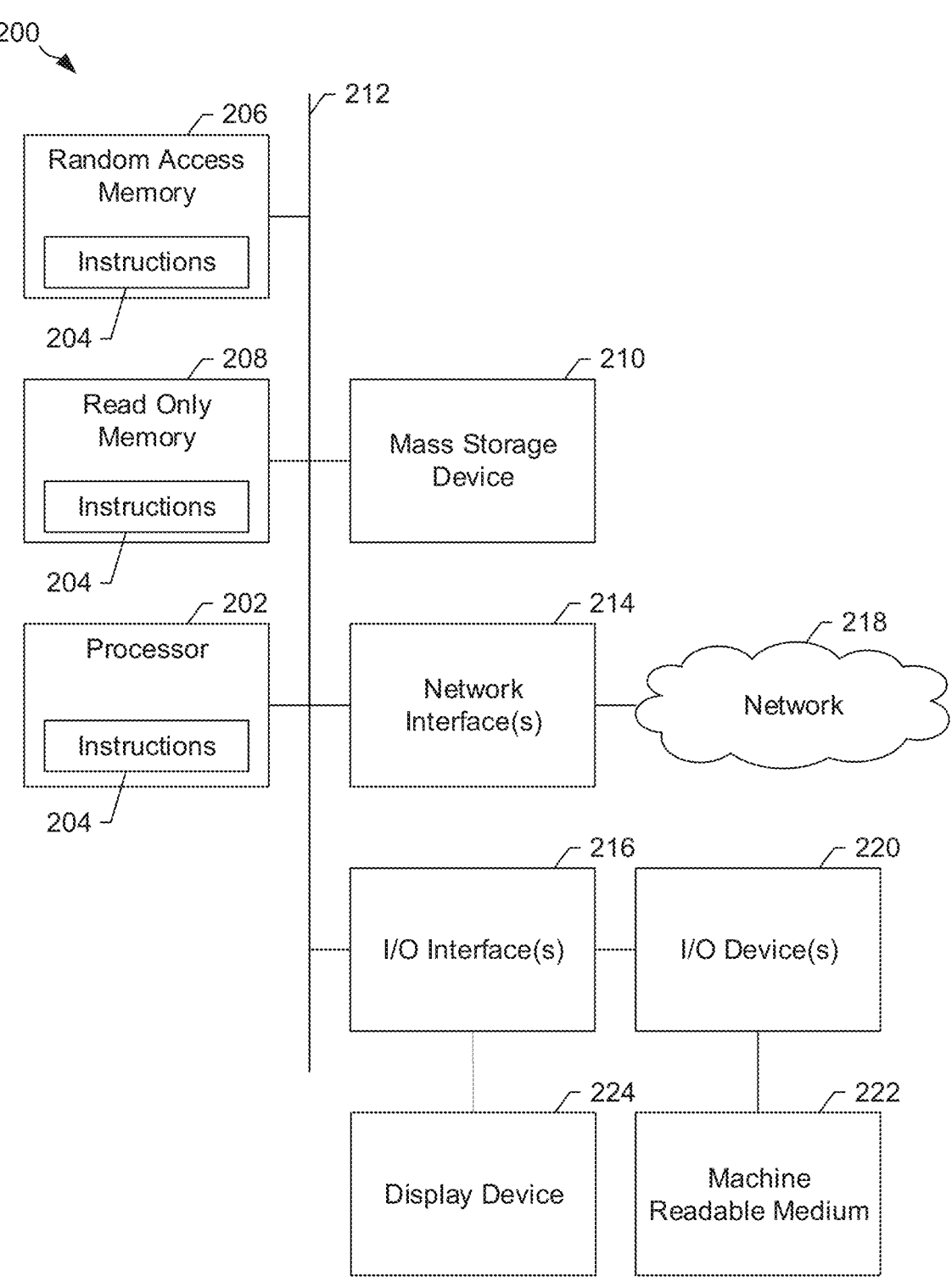
FIG. 2 is a block diagram of an example computing system that may be used to implement the computing device or the central computing system of FIG. 1.

FIG. 2 is a block diagram of an example computing system 200 that may be used to implement the computing device 10 or the central computing system 46 of FIG. 1. The example computing system 200 may be implemented using a personal computer, a server, a smartphone, a laptop computer, a workstation, a tablet computer, and/or any other type of computing device.

The example computing system 200 of FIG. 2 includes a processor 202. The example processor 202 may be any general purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the computing system 200 to a communications network 218 such as the Internet. For example, the network interface 214 may include IEEE 202.X-compliant wireless and/or wired communications hardware for transmitting and/or receiving communications.

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, FireWire®, a field bus, and/or any other type of interface. The example weight indicator 116 includes a display device 224 (e.g., an LCD screen) coupled to the I/O interface 216. Other example I/O device(s) 220 may include a keyboard, a keypad, a mouse, a trackball, a pointing device, a microphone, an audio speaker, an optical media drive, a multi-touch touch screen, a gesture recognition interface, a magnetic media drive, and/or any other type of input and/or output device.

The example computing system 200 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray Discs®, etc.), magnetic media (e.g., floppy disks), portable storage media (e.g., portable flash drives, secure digital (SD) cards, etc.), and/or any other type of removable and/or installed machine readable media.

Part Weld Process Design

As used herein, the term "part" refers a logical grouping of steps necessary to complete a unit of work. The logical grouping of steps defining a part may relate to a manufactured part (i.e., assembly, component, product, etc.) on a manufacturing floor.

Figure 3:
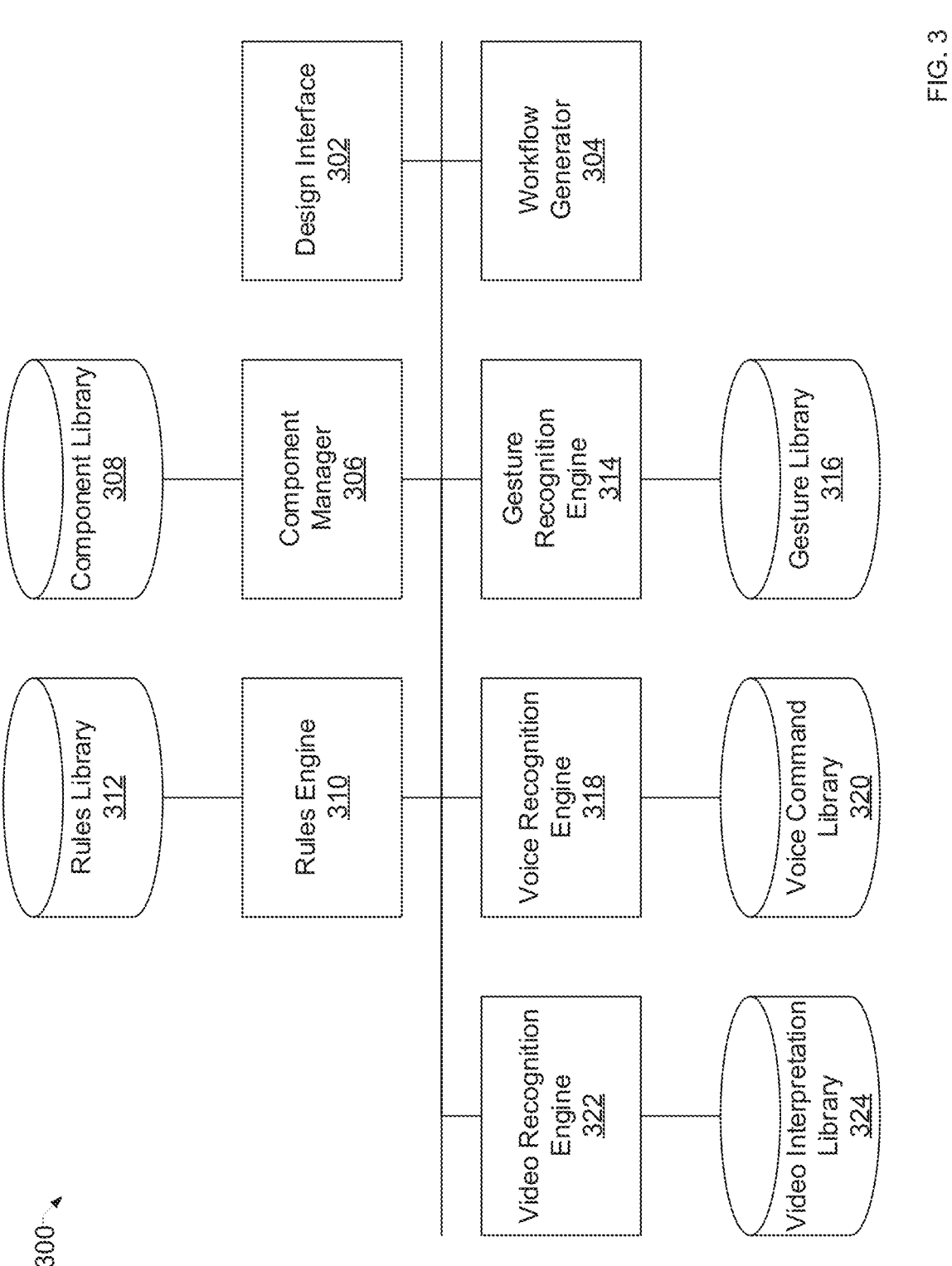
FIG. 3 is a block diagram of an example computing system to design a workflow or part weld process, in accordance with aspects of this disclosure.

FIG. 3 is a block diagram of an example computing system 300 to design a workflow or part weld process. The example computing system 300 may be implemented as any combination of hardware, firmware, and/or software, such as software components executed by the computing system 200.

The example computing system 300 includes a design interface 302 to receive input and provide output for design of a part weld process, including workflow and/or slides. The design interface 302 may be implemented using the display device 224 and one or more of the I/O devices 220 of FIG. 2. In some examples, the part weld process is at least partially constructed or defined using one or more slides. As used herein, a "slide" refers to a single visual screen that can be created and/or edited by a designer (e.g., an administrator, a shop foreman, an engineer, etc.) via the design interface 302 to show one or more of the steps in a larger unit of work. The process to complete a part may involve multiple slides shown to a weld operator in a sequence.

The part weld processes may further include workflows. When executed (e.g., at the computing device 10), workflows include events that may trigger responsive weld instructions within the workflow based on inputs to the computing device 10, slides that are shown to the weld operator to provide weld instructions, weld instructions that may block further execution until appropriate interaction occurs by the weld operator, real-time weld status monitoring and feedback during the workflow, and/or any other weld instructions. Example weld statuses may include a determination of whether the weld is completed or currently being performed (e.g., based on measured weld current), a quality metric of a completed weld (e.g., acceptable, unacceptable, a quality score, etc.), whether a weld has been missed, and/or any other status of the weld. A workflow generator 304 creates workflows based on slides, events, instructions, and/or other inputs received via the design interface 302. During the runtime welding process, the weld operator is presented with the diagram that has been designed on the slide. The weld operator uses the diagram and associated weld instructions to understand and perform the steps necessary to complete the part or other unit of work defined in the workflow.

Using the example computing device 10 and/or the computing system 46 of FIG. 1, a designer can design visual slides, which may visually represent or resemble a schematic, which a weld operator uses during production to understand the steps necessary to finish the part or other unit of work. A component manager 306 of the computing system 300 manages components stored in a component library 308. Example components may include elements (e.g., shapes), welds, annotations, images, media (e.g., audio, video), user control objects, merge fields, and/or areas. However, any other component type may be used. The component manager 306 may also manage assemblies, or complex elements, that include previously constructed combinations of components. Assemblies may be combined by the component manager 306 such that the composing elements are treated as a single object in the user interface.

Components may be created, selected, added to slides, modified, deleted from slides, and/or otherwise manipulated by a designer or maintenance personnel of the computing system 300 via the design interface 302, and changes are stored by the example component manager 306 in the component library 308.

In some examples, visual elements may be selected and positioned onto a slide using an input device (e.g., a computer mouse, a touchscreen, etc.). Those elements are dragged from a pool of elements, welds, annotations, images, and areas, and dropped onto a working canvas that represents the slide. Disclosed examples enable part weld process design using unconventional design tools, such as a tablet computer or other drawing tablet.

Figure 4:
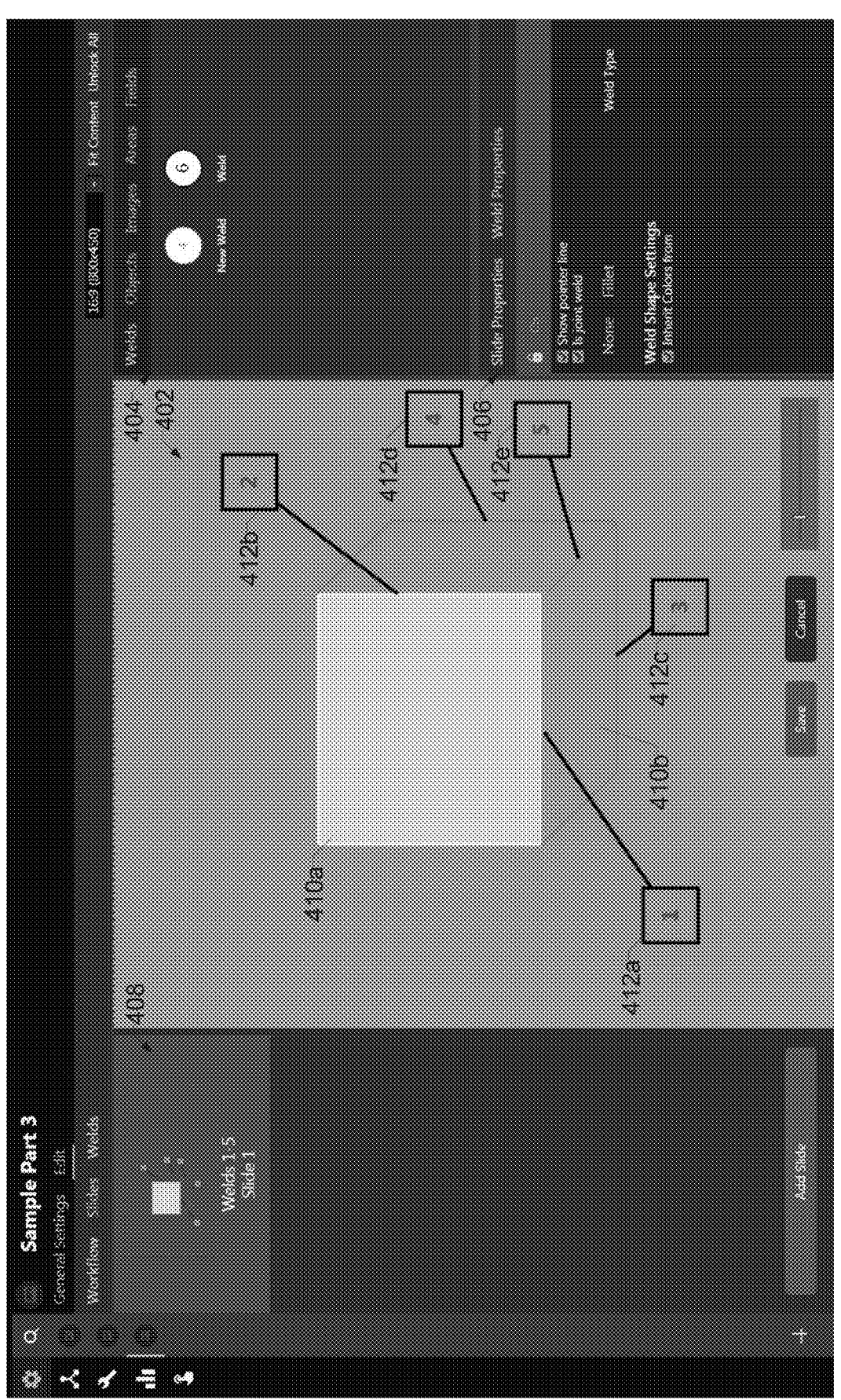
FIG. 4 illustrates an example design interface that may be used to implement the design interface of FIG. 3.

FIG. 4 illustrates an example design interface 400 that may be used to implement the design interface 302 of FIG. 3. The example design interface 400 includes a slide canvas 402, a component selector 404, a component properties manager 406, and a slide menu 408. The slide canvas 402 is a visual representation of the weld instructions that are shown to the operator via the computing device 10 during operation. Components such as part elements 410a, 410b and weld indicators 412a, 412b, 412c, 412d, 412e may be dragged from the component selector 404 to a desired position on the slide canvas 402. The component selector 404 enables a designer to select any component available from the component library 308 for inclusion in the slide canvas 402. The example component manager 306 also track deletion of previous components from the slide canvas 402 and may make resulting changes to other components. For example, if a first weld in a weld order (e.g., the weld indicator 412a) is removed from the slide canvas 402, the example component manager 306 adjusts the weld numbers of the remaining weld indicators 412b-412e and makes another weld indicator available in the component selector 404.

The component properties manager 406 enables a designer to specify certain properties of the slide and/or of the component(s). The specified properties are stored by the component manager 306 in the component library 308. Example properties include definition of colors, and inheritance of one or more properties from other slides or components.

The slide menu 408 enables creation and/or deletion of slides from apart weld process, and/or selection of particular slides of a part weld process for modification.

Figure 5:
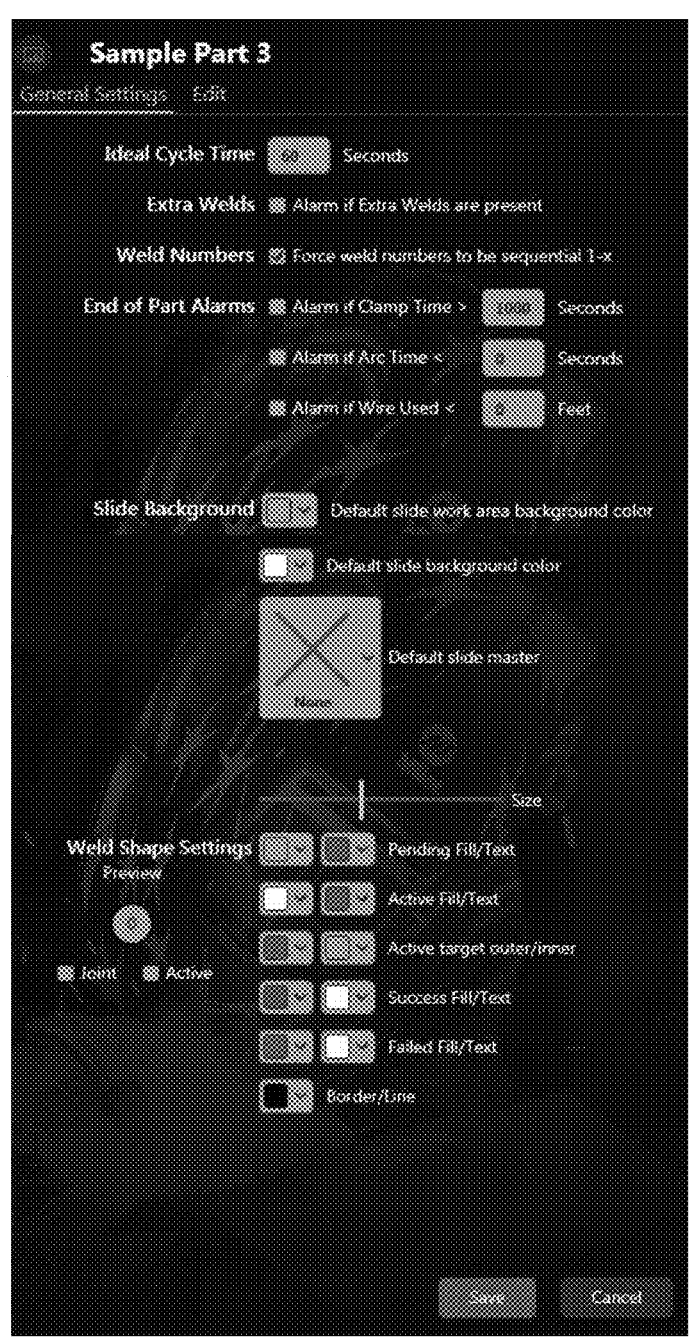
FIG. 5 illustrates an example part weld process properties interface that may be used to implement the design interface.

FIG. 5 illustrates an example part weld process properties interface 500 that may be used to implement the design interface 302. The example part weld process properties interface 500 of FIG. 5 includes global properties for the slides and/or components in a selected part weld process. For example, the global properties may be applied to each slide, event, component, and/or weld instruction created for the part weld process unless overridden at the individual slide, event, component, and/or weld instruction. Example global properties include slide and/or component default colors, a selection of a slide master for creating slides, weld limits (e.g., number limits, weld count limits, etc.), part time limits, and/or any other properties.

A rules engine 310 enforces aspects of a part weld process based on a set of custom and/or system-defined rules. Rules may involve visual display of slides, behavior of a part weld process, weld instruction management, and/or any other rules that may be defined. Rules are stored in a rules library 312, and may be global (e.g., applying to all parts), public (e.g., selectively applicable to parts), private (e.g., applicable to specific parts), and/or have any combination of global, public, and/or private characteristics.

During part weld process design using disclosed example systems (e.g., drag-and-drop operations) the rules engine 310 may maintain the visual look of the slide and the integrity. For example, a rule may be enforced that a slide can have only one instance of a defined weld at any given time. The rules engine 310 enforces the rule during drag and drop operations. Control modifiers such as keystrokes may be used to change design behavior when dragging and dropping components, such as using the "ctrl," "shift," and/or "alt" keys to modify the operation of the rules engine during the drag/drop operation.

Additionally or alternatively, the rules engine 310 may maintain a consistent visual appearance of objects in a slide by managing appearance configurations for components. For example, components added to a slide can have many different visual appearances (e.g., fill color, border color, size, etc.). The rules engine 310 may help the designer maintain a consistent appearance by storing and duplicating visual settings from previously-added components to newly-added components. Thus, the rules engine may reduce the configuration being done by the user, such as having to manually configure the appearance of each and every component added to the slide while maintaining the consistent component appearance.

In some examples, a designer may copy one or more components of one part weld process, and duplicate the components into one or more other part weld processes to save time. The example rules engine 310 maintains the configurations of the duplicated components from the part weld process that follows a set of rules both defined by Miller (as the creator of the application) and defined by the end user to meet their requirements. For example, the rules engine 310 may enforce a rule that a slide can have only one instance of a defined weld (e.g., only one "weld 1," only one "weld 2," etc.). During a copy/paste operation involving a numbered weld, the rules engine 310 may enforce the weld numbering by changing one or more conflicting weld numbers.

The example computing system 300 includes a gesture recognition engine 314 that recognizes gestures by a designer and takes actions based on the recognized gesture(s). The example gesture recognition engine 314 enables the designer to add various weld symbols and/or other elements to their slides using a touch screen and/or gestures. As used herein, the term "gesture" refers to one or more freehand strokes with an input device that are interpreted to take an action. For example, the gesture recognition engine 314 may recognize a gesture (e.g., via touchscreen, mouse, etc.) and perform the associated action. Gesture characteristics (e.g., the features used to recognize a gesture) and gesture responses (e.g., actions taken in response to a gesture) are stored in a gesture library 316 and accessed by the gesture recognition engine 314 for gesture recognition and/or response. When the gesture is recognized, the computing system 300 takes one or more actions corresponding to the identified gesture.

Example gestures may involve freehand drawings of simple shapes that are interpreted to insert a corresponding component or take a specific action. For example, the a designer draws a crude weld symbol on the slide. In response, the gesture recognition engine 314 places a weld symbol of the type matching the drawn symbol and automatically number the weld. The designer may further enhance the weld symbol with borders, fills, text in the center, and/or other modifications.

Recognition of gestures and/or reaction to gestures may occur immediately and/or as a batch. The use of gestures may be more natural to some designers. Using gestures, a designer can draw the slide freehand, and the gesture recognition engine 314 converts the drawn elements to corresponding objects, symbols, and/or properties, corresponding to the locations in which the elements are drawn. Thus, disclosed examples improve the ease and speed with which part weld process design is accomplished.

In some examples, the designer can create and store custom gestures in the gesture library 316. The designer may apply the custom gestures to desired commands, such as frequently used commands and/or shapes used by the designer during part weld process design.

Figure 6A:
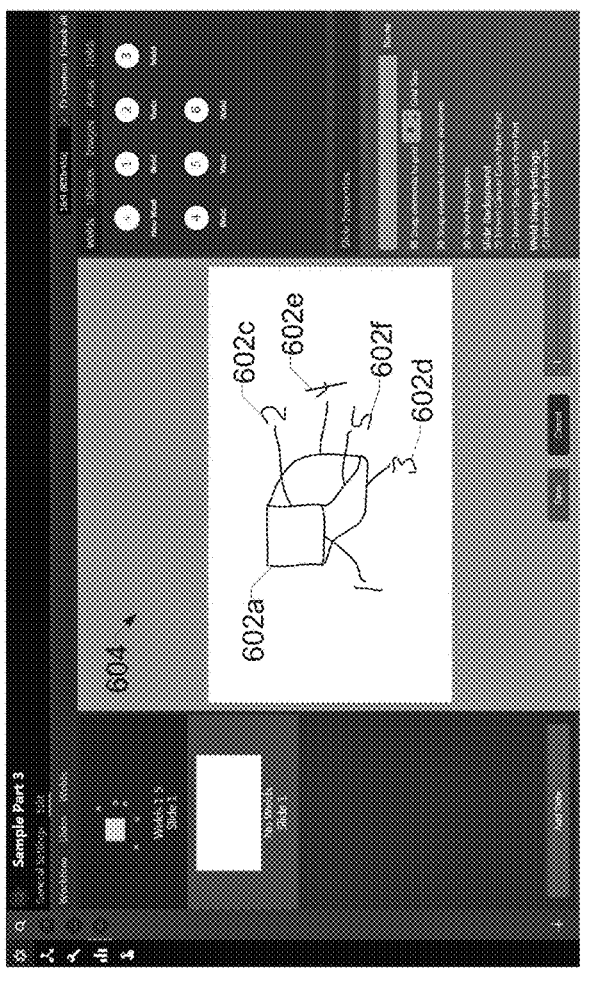
FIG. 6A illustrates a set of example gestures on a slide canvas.
Figure 6B:
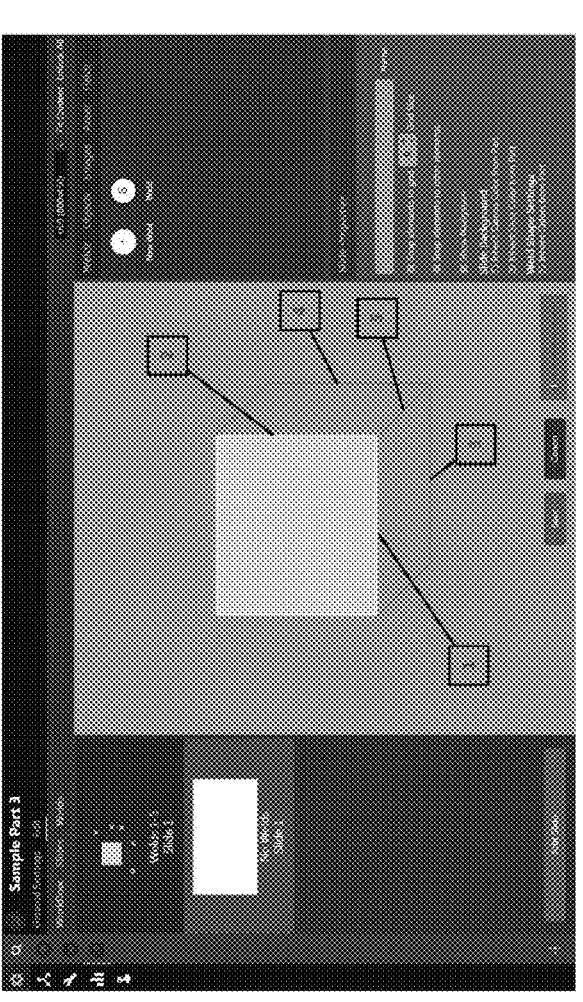
FIG. 6B illustrates the resulting component and weld instructions on the slide canvas after interpretation of the gestures of FIG. 6A.

FIGS. 6A and 6B illustrate an example interface 600 that may be used to implement the design interface 302 of FIG. 3 before and after interpretation of example gestures by the gesture recognition engine 314. FIG. 6A illustrates a set of example gestures 602a-602f on a slide canvas 604. The gestures 602a-602f including a component gesture 602a (e.g., a workpiece) and multiple weld indicator gestures 602b-602f, including the weld number of each weld indicator. FIG. 6B illustrates the resulting component and weld instructions on the slide canvas after interpretation of the gestures.

Figure 7:
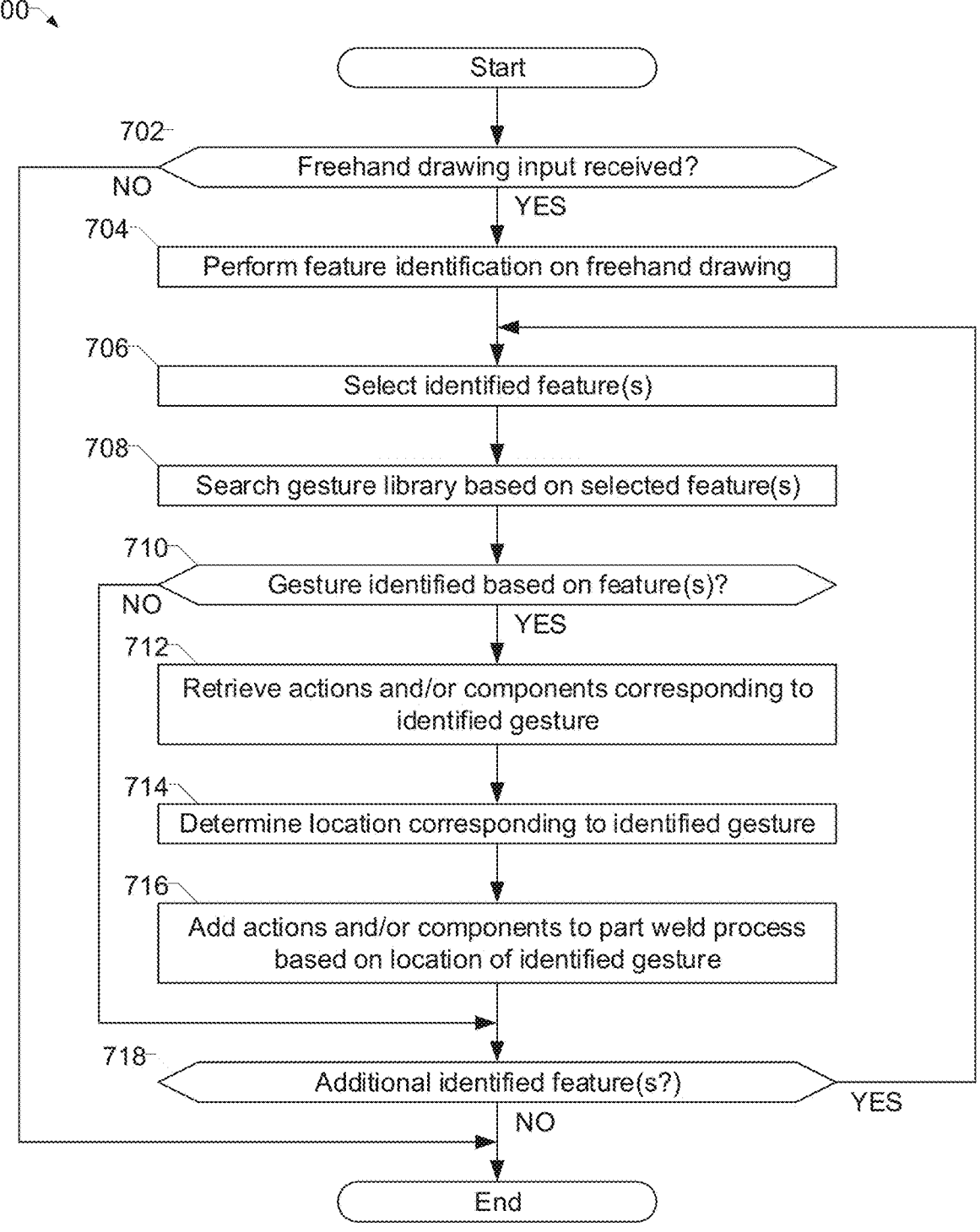
FIG. 7 is a flowchart representative of example machine readable instructions which may be executed to generate weld instructions and/or other aspects of a part weld process using gesture recognition.

FIG. 7 is a flowchart representative of example machine readable instructions 700 which may be executed to generate weld instructions and/or other aspects of a part weld process using gesture recognition. The example instructions 700 may be performed by the example computing system 46, the computing system, 200 and/or the computing system 300 of FIGS. 1, 2, and/or 3. The example instructions 700 are described below with reference to the computing system 300, which may be implemented by the processor 202 executing the instructions 204 of FIG. 2.

At block 702, the gesture recognition engine 314 determines whether freehand drawing input has been received. If freehand drawing input has been received (block 702), at block 704 the gesture recognition engine 314 performs feature identification on the freehand drawing input. For example, the gesture recognition engine 314 may use any type of feature recognition techniques to identify and/or classify features in the freehand drawing input. The gesture recognition engine 314 may reference feature definitions in the gesture library 316 to identify features.

At block 706, the gesture recognition engine 314 selects one or more identified feature(s). At block 708, the gesture recognition engine 314 searches the gesture library 316 based on the selected feature(s). For example, codes or data representative of the feature(s) may be used to lookup gestures stored in the gesture library 316.

At block 710, the gesture recognition engine 314 determines whether any gestures have been identified based on the selected feature(s). If one or more gestures have been identified based on the selected feature(s) (block 710), at block 712 the gesture recognition engine 314 retrieves (e.g., from the gesture library 316) actions and/or components corresponding to the identified gesture(s).

At block 714, the gesture recognition engine 314 determines a location (e.g., on a slide containing the freehand drawing input) corresponding to the identified gesture. The type of gesture may determine the location of the corresponding feature. At block 716, the gesture recognition engine 314 adds actions and/or components to the part weld process based on the location of the identified gesture. For example, the gesture recognition engine 314 may add weld instructions in the form of actions or components by looking up the gesture in the gesture library 316 and determining the associated weld instructions.

After adding the actions and/or components (block 716), or if no gestures are identified using the selected feature(s) (block 710), at block 718 the gesture recognition engine 314 determines whether additional feature(s) and/or combinations of features may be used to identify gestures. If there are additional feature(s) and/or combinations of features (block 718), control returns to block 706 to select other feature(s).

When there are no additional feature(s) and/or combinations of features (block 718), or if no freehand drawing input has been received (block 702), the example instructions 700 end.

Additionally or alternatively to gestures, the designer may create slides using voice commands. The example computing system 300 includes a voice recognition engine 318 that receives audio input, parse the audio to recognize words and/or phrases in the audio, and take one or more actions in response to recognizing the words and/or phrases. A voice command library 320 may store the words and/or phrases, including preset words and/or phrases and/or custom words and/or phrases selected by the designer (or other user). For example, during design of the slide a designer can say one or more predetermined words or phrases that trigger the voice recognition engine 318 to recognize the stated words and/or phrases, look up the corresponding actions in the voice command library, and take the corresponding actions. Example phrases may add, modify, or delete components, select particular components within a slide, duplicate components, and/or take any other actions.

FIG. 8 is a flowchart representative of example machine readable instructions 800 which may be executed to generate weld instructions and/or other aspects of a part weld process using voice command recognition. The example instructions 800 may be performed by the example computing system 46, the computing system, 200 and/or the computing system 300 of FIGS. 1, 2, and/or 3. The example instructions 800 are described below with reference to the computing system 300, which may be implemented by the processor 202 executing the instructions 204 of FIG. 2.

At block 802, the gesture recognition engine 314 determines whether audio input has been received. If audio input has been received (block 802), at block 804 the voice recognition engine 318 performs feature identification on the audio input. For example, the voice recognition engine 318 may use any type of voice recognition or identification techniques to identify and/or classify features in the audio input. The voice recognition engine 318 may reference voice features in the voice command library 320 to identify features.

At block 806, the voice recognition engine 318 selects one or more identified feature(s). At block 808, the voice recognition engine 318 searches the voice command library 320 based on the selected feature(s). For example, hashes representative of the audio feature(s) may be used to lookup audio or voice commands stored in the voice command library 320.

At block 810, the voice recognition engine 318 determines whether any voice commands have been identified based on the selected feature(s). If one or more voice commands have been identified based on the selected feature(s) (block 810), at block 812 the voice recognition engine 318 retrieves (e.g., from the voice command library 320) actions and/or components corresponding to the identified voice command(s).

At block 814, the voice recognition engine 318 determines a location (e.g., on a slide active at the time the audio input was received, or otherwise indicated in the voice command) corresponding to the identified voice command. The voice command and/or additional information included as auxiliary voice information may determine the location of the corresponding feature. At block 816, the voice recognition engine 318 adds actions and/or components to the part weld process based on the determined location. For example, the voice recognition engine 318 may add weld instructions in the form of actions or components by looking up the voice command in the voice command library 320 and determining the associated weld instructions.

After adding the actions and/or components (block 816), or if no voice commands are identified using the selected feature(s) (block 810), at block 818 the voice recognition engine 318 determines whether additional feature(s) and/or combinations of features may be used to identify voice commands. If there are additional feature(s) and/or combinations of features (block 818), control returns to block 806 to select other feature(s).

When there are no additional feature(s) and/or combinations of features (block 818), or if no audio input has been received (block 802), the example instructions 800 end.

The example computing system 300 further includes a video recognition engine 322 and a video interpretation library 324. In some examples, the computing system 300 generates a workflow and/or weld instructions using video of a weld operator captured while that operator performed assigned operations. The operations may be related to a specific part and/or more general work-related functions. Video interpretation instructions may be generated and/or stored by manually training the video recognition engine 322 to recognize activities and/or context by using sample video and/or corresponding sample data from other sensors in the weld cell.

For example, using video interpretation techniques stored in the video interpretation library 324, the video recognition engine 322 may recognize operations involving fitting, clamping, welding, cleaning, and/or otherwise creating a part. The video recognition engine 322 may additionally or alternatively recognize operations involving weld cell cleaning, consumable replacement, equipment maintenance, and/or any other functions performed by the operator that are not necessarily part-related. The example video recognition engine 322 constructs slides and/or part weld processes based on analyzing the video, which may be done in conjunction with other data such as monitored weld data and/or other sensors observing activity or data within the weld cell. The example video recognition engine 322 may construct slides and/or part weld processes that can later be used by other operators to duplicate the recorded weld operator's efforts.

Figure 9:
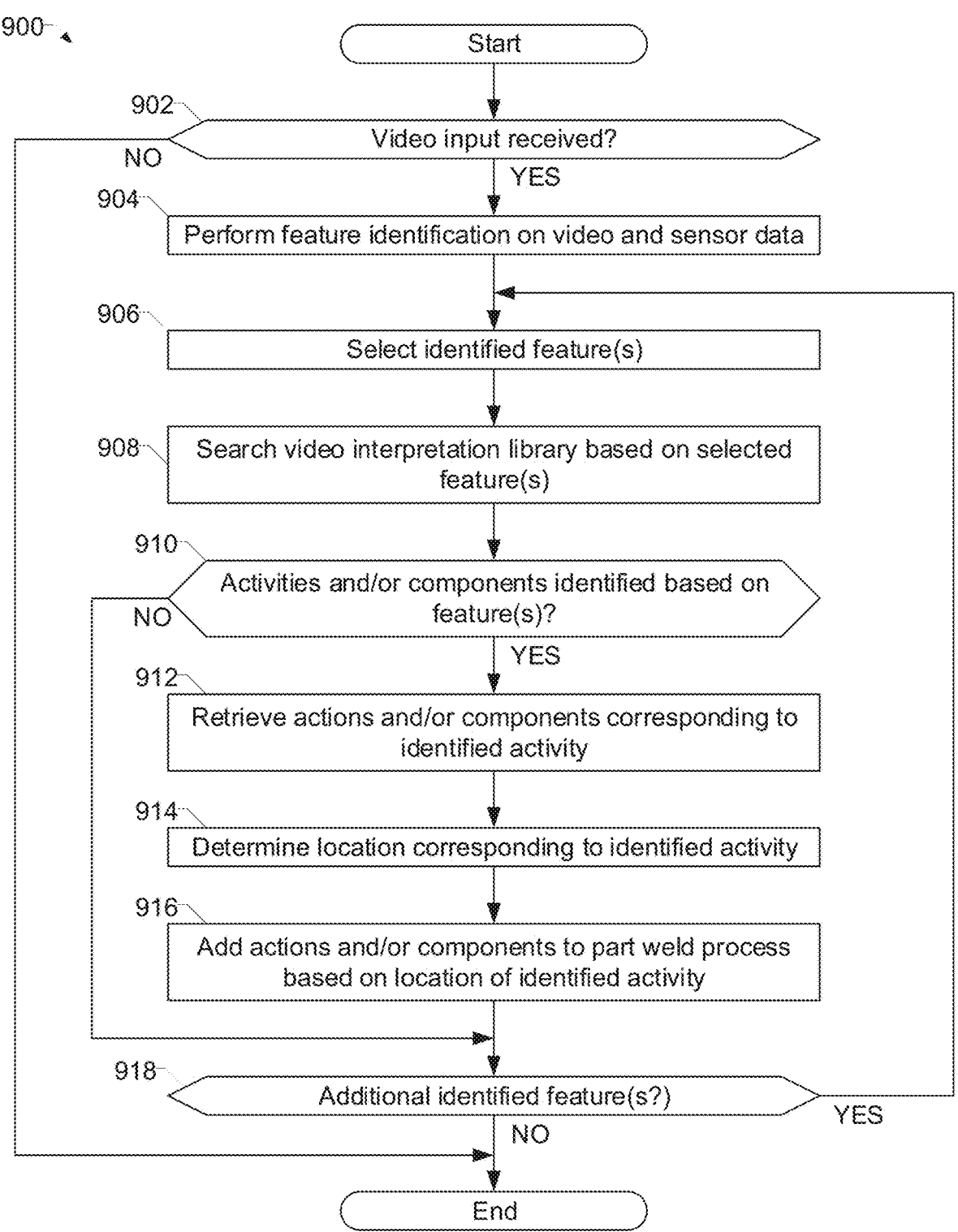
FIG. 9 is a flowchart representative of example machine readable instructions which may be executed to generate weld instructions and/or other aspects of a part weld process using video interpretation and recognition.

FIG. 9 is a flowchart representative of example machine readable instructions 900 which may be executed to generate weld instructions and/or other aspects of a part weld process using video interpretation and recognition. The example instructions 900 may be performed by the example computing system 46, the computing system, 200 and/or the computing system 300 of FIGS. 1, 2, and/or 3. The example instructions 900 are described below with reference to the computing system 300, which may be implemented by the processor 202 executing the instructions 204 of FIG. 2.

At block 902, the video recognition engine 322 determines whether video input has been received. For example, a designer may select a video from a file system using the design interface 302 for analysis by the video recognition engine 322. Video input may include images captured in one or more spectra (e.g., visible light, infrared, ultraviolet, etc.), depth maps, three-dimensional scanning, and/or any other type of captured video.

If video input has been received (block 902), at block 904 the video recognition engine 322 performs feature identification on the video input and/or sensor data associated with the video. For example, the video recognition engine 322 may use any type of image and/or video recognition and/or identification techniques, which may include machine learning, to identify and/or classify features in the video input. The video recognition engine 322 may use sensor data captured simultaneously with the video to assist in determining actions that are occurring in the weld cell. For example, voltage, current, wire speed, and/or brightness sensors may indicate that welding is occurring. Clamping sensors may indicate that part fitting has been completed. The video recognition engine 322 may reference video features in the video interpretation library 324 to identify features and/or actions.

At block 906, the video recognition engine 322 selects one or more identified feature(s). Features may include video and/or image features, sensor data, and/or any other associated information. If three-dimensional scanning or other operator detection video is used, the features may include operator body positioning. At block 908, the video recognition engine 322 searches the video interpretation library 324 based on the selected feature(s). For example, the video interpretation library 324 may search based on colors, operator body position, sensor data, and/or any other data obtained as an identified feature and/or combination of features.

At block 910, the video recognition engine 322 determines whether any activities and/or component(s) has been identified based on the selected feature(s). If one or more activities have been identified based on the selected feature(s) (block 910), at block 912 the video recognition engine 322 retrieves (e.g., from the video interpretation library 324) actions and/or components corresponding to the identified activity and/or component.

At block 914, the video recognition engine 322 determines a location corresponding to the identified activity. For example, the video recognition engine 322 may identify a part on which the weld operator is working and, more specifically, the portion of the part on which the weld operator is performing an activity. For example, the video recognition engine 322 may identify that tack welding is occurring on the part along a particular seam, or that a weld is occurring at a particular location, and generate a corresponding weld instruction. At block 916, the video recognition engine 322 adds actions and/or components to the part weld process based on the determined location.

For example, the video recognition engine 322 may add weld instructions in the form of actions or components by looking up the activity in the video interpretation library 324 and determining the associated weld instructions. The example video interpretation library 324 may determine the shape and/or contours of a part to be manufactured by, during fitting of the part by the operator, using three-dimensional scanning or other techniques to determine the contours of the components, the assembly process performed by the operator, and the resulting assembly of components. The example video recognition engine 322 may identify the locations to be welded based on the recognized assembly and/or recognize the welds that are performed by the operator.

After adding the actions and/or components (block 916), or if no components or activities are identified using the selected feature(s) (block 910), at block 918 the video recognition engine 322 determines whether additional feature(s) and/or combinations of features may be used to identify components and/or activities. If there are additional feature(s) and/or combinations of features (block 918), control returns to block 906 to select other feature(s).

When there are no additional feature(s) and/or combinations of features (block 918), or if no video input has been received (block 902), the example instructions 900 end.

The example design interface 302 enables a designer to use two-dimensional components (e.g., images) and/or three-dimensional components. For example, an image may be generated based on a perspective view of a three-dimensional computer model (e.g., a two-dimensional image of the three-dimensional model taken from a specified point-of-view). The model, the image, the perspective, and/or one or more references to the source material may be stored in the component library 308 and/or managed by the component manager 306. The design interface 302 may enable the user to manipulate three-dimensional models within the slide design interface, and/or add a component (e.g., an image) generated using a three-dimensional modeling tool such as a computer aided drafting (CAD) program.

The three-dimensional computer model and the perspective may be linked (e.g., by the component manager 306) such that, if changes are made to the model, any perspectives of that model that are used to create slides are automatically updated to reference the updated three-dimensional model. In some examples, the computing device 10 references the model and renders an updated image when the workflow is executed to ensure the most recent version is used. In other examples, the designer may update the workflow slides with an updated rendering to reduce the computing load on the computing device 10 during execution of the workflow.

Disclosed weld process design systems and methods provide a faster and more intuitive visual design system for generating and editing visual work instructions that make up a part or other unit of work. Disclosed systems and methods provide clear indications of available components that can be added to a visual set of work instructions. Example systems and methods enable designers to capture existing processes in a manner that allows the processes to later be duplicated by individuals other than the individuals who created the process, such as by creating a corresponding set of work instructions from the captured processes.

Weld Instruction Workflows

Figure 10:
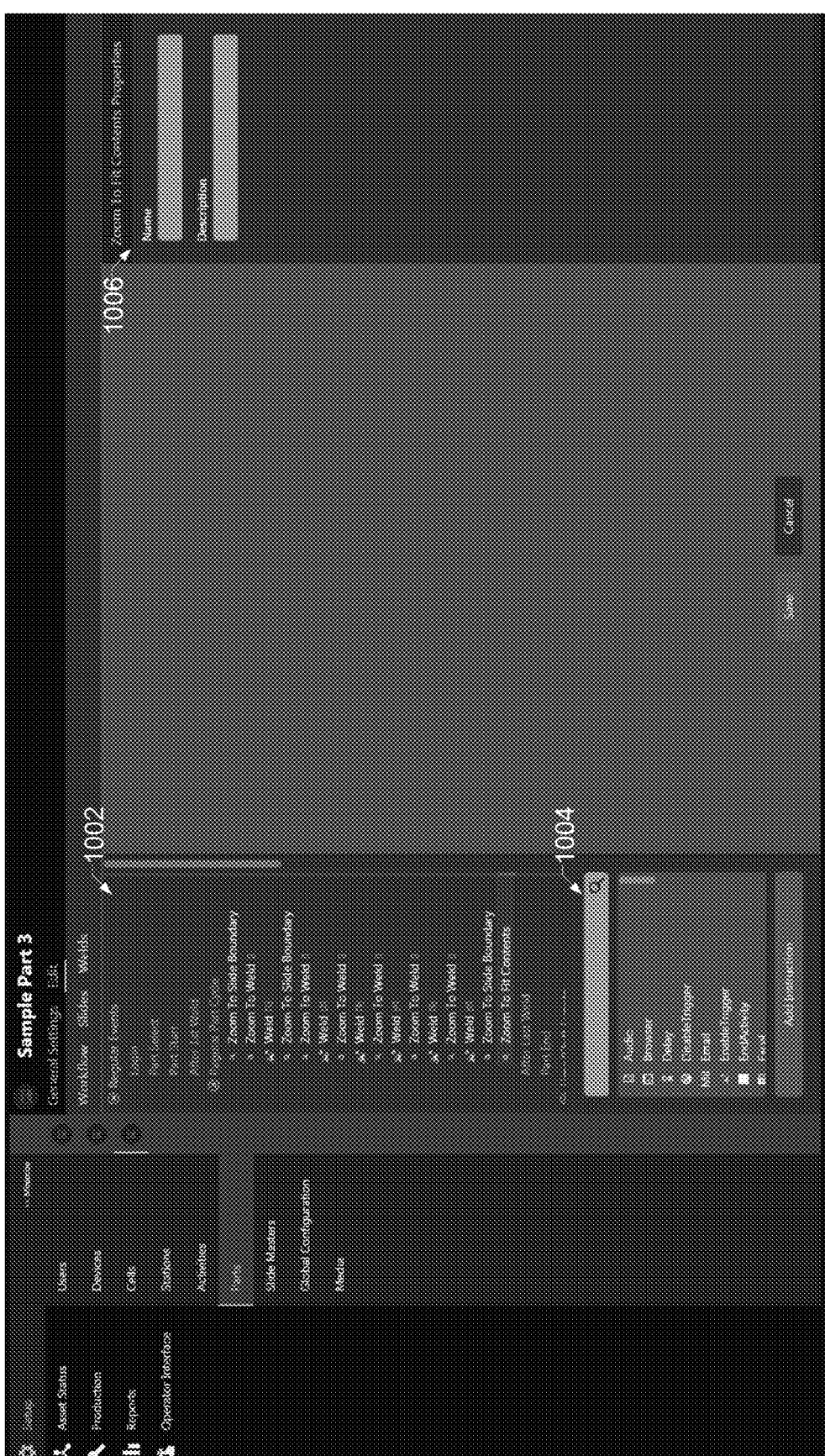
FIG. 10 illustrates an example workflow interface that may be used to design a workflow in a part weld process.

FIG. 10 illustrates an example workflow interface 1000 that may be used to design a workflow in a part weld process. The example workflow interface 1000 may implement the example design interface 302 of FIG. 3. The workflow interface 1000 enables a designer to modify workflows that affect a selected part, multiple parts, equipment, and/or an operator (e.g., the operator's shift).

The example workflow interface 1000 includes a workflow definition list 1002 that includes the list of events to which the workflow may respond. For example, a "regular part cycle" event may be performed during normal performance of the part weld process of the particular part, and involves a set of defined weld instructions that are set by the designer. The workflow interface 1000 also includes an instruction selector 1004 from which a designer may select weld instructions to associate with an event in the workflow definition list 1002. The workflow interface 1000 further includes an instruction configuration interface 1006 that display configurable properties of a selected weld instruction and enables a designer to modify the configurable properties.

During operation using apart weld process (e.g., using the computing device 10 of FIG. 1 to display weld instructions to the weld operator), events may be triggered by inputs to the computing device 10 and/or events internally identified by the computing device 10. Example inputs to the computing device 10 may include weld-related devices (e.g., data from a welding power supply, torch trigger, wire feeder, etc.), data from weld cell sensors (e.g., the sensors 18-24), weld monitoring devices (e.g., the weld data collection device 50 of FIG. 1), and/or an external computing system (e.g., the computing system 46 of FIG. 1). Additionally or alternatively, logic-driven or rule-driven events may be generated by the computing device 10 by combining inputs and/or data.

An example event that may be identified at the computing device 10 includes a change in an Operational Digital Interface state. For example, changes in state at a Digital interface to a weld monitor (e.g., the weld data collection device 50) or a power supply can trigger a context specific event at the weld monitor, the power supply, the computing device, the external computing system 46, and/or at any other device. Example Digital Interface states that may be used as inputs by the weld monitor 50 may include an input received for beginning part tracking, an input received for ending part tracking, an input received for resetting of a part or set of weld instructions, an input received for a weld fault event, and/or an input received for a selection of a part type. When received or identified by the weld monitor 50, the inputs may be used as triggers for other events or instructions. Example Digital Interface states that may be used as outputs by the weld monitor 50 to another device may include an output occurring in response to identifying a missing weld, an output occurring in response to identifying an incomplete weld, an output occurring in response to identifying a weld that violates process control limits, and/or an output occurring in response to identifying an extra weld. As an example, the Digital Interface state outputs may cause disabling of the weld torch trigger and/or disabling of weld output at the power supply.

In some examples, an event may be triggered by a supervisor. For example, a shop or floor supervisor (or other authorized person) may instigate events in the welding cell as desired, such as a supervisor requesting an activity identification. The workflow interface 1000 may be used to establish an operator prompt at the computing device 10 in response to the supervisor-triggered event. The supervisor may be limited to triggering specific events, or may be permitted to trigger any available event.

Another example event is a robotic communications event. The robotic communications events may be limited to automatic or semi-automatic part weld processes, and extends the interface capabilities of a weld monitoring system to interpret and/or utilize movement and/or welding information from the fixture and robot within the welding cell.

In some examples, two or more events may be used to create a combined event that is triggered according to a logical condition. For example, the events may use logical conjunctions, disjunctions, mutual exclusion, and/or any other logic to define an event using other events. An example combined event may be "Event A AND (Event B or Event C)." The workflow interface 1000 enables the part weld process designer to create and configure combined events. Additionally or alternatively, logical events may be defined using logical flows (e.g., branching) with multiple individual events and multiple possible results from the logical event. Following different sequences of individual event triggers in a logical event results in different potential weld instructions. Weld instructions may be provided at the conclusion of a logical path of events and/or within a path of events (e.g., after execution of an event while waiting for the next event branch).

Similarly to logical events, in some examples, events are dependent on both the occurrence of the triggering input and one or more other conditions or stimuli. For example, conditional events based on input stimuli from the welding cell and its context may require a non-event condition to be present or not-present when a specified event occurs to be triggered. Conditional events may be used in conjunction with combined events and/or logical events.

The example instruction selector 1004 enables the designer to attach one or more weld instructions in response to events. Example instructions that may be selected to be part of a workflow include performing a weld (e.g., showing a weld on the relevant slide), showing the operator information associated with a weld (e.g., training information, specific weld instructions, etc.), providing non-welding work instructions to the operator (e.g., cleaning the work area, replacing consumables, etc.), sending messages, prompting the operator to review, acknowledge, and/or provide information via a dialog, and/or any other action.

During part weld process design, the designer defines welds that will occur on the part. Designing the weld instructions includes defining the visual properties of the configuration. The design interface 302 may include a visual property selection section that enables the designer to select a whether to instruct the computing device 10 to zoom into the weld when the weld is active, and the welder is working on the weld. In some examples, the designer may indicate to the computing device 10 that the computing device 10 should zoom out after the weld is complete.

An example instruction that may improve clarity for weld operators during a welding operation involves changing a zoom level of the display. Zoom levels may be selected from predefined levels (e.g., zoom to predefined level 1, predefined level 2, slide level, etc.) and/or dynamically defined (e.g., specified using components of the slide, coordinates, etc.) by the weld instruction or weld program. For example, the weld program and/or weld instructions may include zooming to a weld (e.g., changing a zoom level to focus on a particular weld, zooming to a particular area of a slide based on location of a particular specified weld), zooming to an area (e.g., zooming to a particular specified area of a slide), zooming to a slide boundary (e.g., zooming to a particular specified area of a slide, including snapping to a boundary of the slide), zooming to fit an entire slide, zooming to a predefined level, zooming to fit any selected component, zooming to fit contents (e.g., zooming so as to include all the specified contents or components, such a group of selected components or all components belonging to a part or shape), and/or enabling the weld operator to specify the zooming. In some examples, time-adjacent zooming actions involve panning and/or changing a zoom level directly from a first zoom to a second zoom. Alternatively, time-adjacent zooming actions involve zooming out from the first zoom level before zooming into the second zoom level, which can help orient the welder to the portion of the slide in the second zoom level and reduce mistakes.

In contrast with conventional techniques, disclosed example weld programs make the process of defining and modifying weld programs and weld instructions substantially easier. For example, rather than defining new slides for each desired view (e.g., a first slide with a full part view and a second slide with a partial, closer view of the part), which involves creating or updating multiple assets and populating the created or updated assets into the different slides, the example systems and methods enable definition of a weld program and weld instructions using fewer slides and fewer assets. The example systems and methods also make the process of defining or updating different views or zoom levels much easier, particularly for complicated parts or instructions.

Zooming may be used to reduce mistakes during welding by increasing focus on areas to be given increased care. The ability to define zooming may also reduce slide design time by enabling the designer to use the same slide while emphasizing different parts of the slide, instead of creating multiple slides to provide the same information.

Other example instructions may involve setting and/or clearing a digital interface state (e.g., at the weld data collection device 50). For example, setting and/or clearing a digital interface state may be used to provide digital interface control via programming workflow work instructions and events.

While, in some examples, the same physical slide is stored and the interface zooms to different levels on the same visual slide based on the weld instruction and/or the weld program, in some other examples, a slide that includes zoom instructions is stored as a series of slides including a master slide (e.g., the slide on which the zoom instructions are defined) and child slides that implement the zoom instruction. Thus, when the master slide is updated, the child slides may be replaced or updated based on changes to the master slide while implementing the views corresponding to the zoom instructions. In either representation of the slide including the zoom instructions, the definition and/or updating of slides is substantially easier than conventional systems and methods.

In some examples, the identity, qualifications, metrics, certifications, and/or role of the weld operator may be used as an input to one or more events. Execution and/or bypassing of work instructions may be dependent on the specifics of the actual weld operator who is logged in. For example, weld instructions may be configured to execute instructions when an operator does not have particular training and/or bypassed when the operator is known to have the training and/or a threshold number of parts completed.

Slide Masters

The example design interface 302 of FIG. 3 may be used to create slide masters. In some examples, the design interface 302 uses slide masters as backgrounds that can be designed and reused on individual slides. The design interface 302 enables creation of slide masters similarly way to creating a slide.

Slide masters may be provided a name or other identifier, and a visual thumb is created to represent the slide master. During the part design process, the designer can select a slide master to be used for creating slides. When a slide master is chosen for one or more slides, the slide(s) display the slide master under other added elements. Changes to slide masters are propagated through to each slide referencing the slide master. In some examples, the slide master is used as a background image behind the components on a slide. A thumbnail image may be used to represent slide masters for selection.

In some other examples, the slide master is used as a starting slide. Instances of every component on the slide master are created and populated onto each slide. During the design of the slide, the instances of each component generated based on the slide master may be manipulated in a manner similar or identical to components introduced to the specific slide.

The example design interface 302 may enable chaining of slide masters (e.g., using one slide master to create a second slide master, and/or selection of more than one slide master to individual slide.

The example design interface 302 enables creation and manipulation of shapes. In some examples, the design interface 302 enables shapes to be designed like slides. Visual representations of items are dragged and/or otherwise added to the slide canvas and/or arranged by the designer. When the desired shape and/or set of visual objects are arranged and configured, the designer can save the arrangement as a new shape using the component manager 306. The newly defined shape is stored in the component library 308 and can be used in other slides, slide masters, and/or designing additional custom shapes. The designer is able to reuse the shapes on many slides, thereby saving the designer time. If the shape is modified at a later time, the user may choose to apply changes to the shape to one or more (e.g., all) of the places where the shape is used. In some examples, changes to the shape in the component library 308 causes the component manager 306 to automatically update all instances of the shape in all slides and/or slide masters.

The example component library 308 may include pre-created shapes and/or slide masters, which are made available to users of the computing system 300. The user can copy the pre-created shapes and use the shapes in custom weld part process designs.

In some examples, shapes may include variable fields or other components that are populated based on data collected during a weld. The variable fields are managed as components (e.g., similar to shapes) and may be used in specific situations to show specific data to the weld operator. In some examples, the use of such shapes is limited to certain events or other situations. For example, a results page shape may be available to be displayed at the completion of a part weld process, and include variable fields having end-of-part process-specific information populated within the shape based on weld data collected during the part weld process.

An operation interface control may be added to slides or other weld operator interface components using the design interface 302. Operation interface controls are shown to a weld operator during normal weld process steps, and may be displayed independently of the slides and/or other part weld process information. Operation interface controls enable organizations to display organization-specific custom information to weld operators. The operation interface control may be a configurable dashboard screen that permits a designer to specify the information shown to weld operators, the format in which the information is shown, and/or the locations in which the information is seen on the display.

In some examples, the design interface enables a designer to dynamically design end-of-weld documents to track the weld for a period of time following manufacture (e.g., for an expected life of the weld or part). The end-of-weld documents may be considered a type of "birth certificate" for the weld or part, which contain information describing the manufacture of the part or weld. Each organization could require different information on end-of-weld documents, and end-of-weld documents may be designed using a template. The end-of-weld document template may be used to create a hard copy (like a PDF) of the document at the completion of the weld or part. The end-of-weld document can later be reviewed to understand the dynamics of the weld or part as the weld or part was made, and/or other information that was recorded during the making of the weld or creation of the part.

Disclosed examples can significantly reduce visual weld process development time by enabling custom shapes for users to apply, categorizing shapes and/or templates, and/or altering existing shapes to propagate changes to a number of different slides, templates, and/or shapes.

Queueing, Re-Ordering and Prioritization

Conventionally, work instructions were executed immediately in the order specified by the work events that occurred. If some acknowledgement or wait time (e.g., for viewing a training video or other media) was required by the instructions, then the work instruction being executed would 'block' any further operation of the software. Work instructions that require some form of acknowledgement may block the execution of the system by preventing the software from continuing.

The example workflow generator 304 generates a workflow including the work instructions such that work instructions to be performed are queued in one or more execution queues to allow for real-time prioritization and re-ordering (e.g., automatic and/or manual reordering) of work instructions to be performed. For example, the workflow generator 304 may provide one or more triggers to enable automated clearing of work instructions from the execution queues to avoid long term and/or undesired blocking states. As an example, a list of work instructions may be specified, which occur as a result of starting a new part. The workflow generator 304 generates the workflow such that these work instructions are added to the execution queue in the order they are specified. In some examples, another event (e.g., an operator alert message) may occur while the system is waiting for responses to the existing list of queued work instructions triggered by the Part Start event. If this operator alert event also has work instructions, the operator alert event instructions may be of a higher priority than the current list waiting for execution.

Additionally or alternatively, the workflow generator 304 may provide manual features when blocking instructions are detected to enable an operator to bypass the blocking state, such as after the blocking state has persisted for at least a threshold time duration, by clearing work instructions from the execution queue(s). In some examples, events can automatically force re-prioritization of the execution queue work instructions that result from them.

The example workflow generator 304 and/or the computing device 10 are configured to enable automatic clearing of unacknowledged and/or blocking work instructions from the execution queue. The automatic clearing may prevent long term and/or undesired blocking states in the software, and/or prevent work instructions from stacking up. In some examples, all queued work instructions are cleared when a new part is loaded. In some examples, all work instructions from part operations are cleared when that part is ended. Clearing of queued instructions enables the system to provide non-blocking operation in cases requiring operator acknowledgement of instructions. By using the execution queue, instructions requiring user acknowledgement will not necessarily cause a blocking state.

In some examples, the workflow generator 304 and/or the computing device 10 are configured to enable bypassing execution of work instructions and/or replaying of work instructions by the operator. For example, instead of a work instruction that requires immediate attention and acknowledgement from the operator, the work instruction may be added to a list of queued work instructions which are presented to the operator for selection and/or replay at the operator's discretion. As another example, a long list of instructions can be listed as replay recommendations, instead of being executed as blocking instructions that require operator confirmation, if the operator is experienced or has the proper credentials and/or training.

Figure 11:
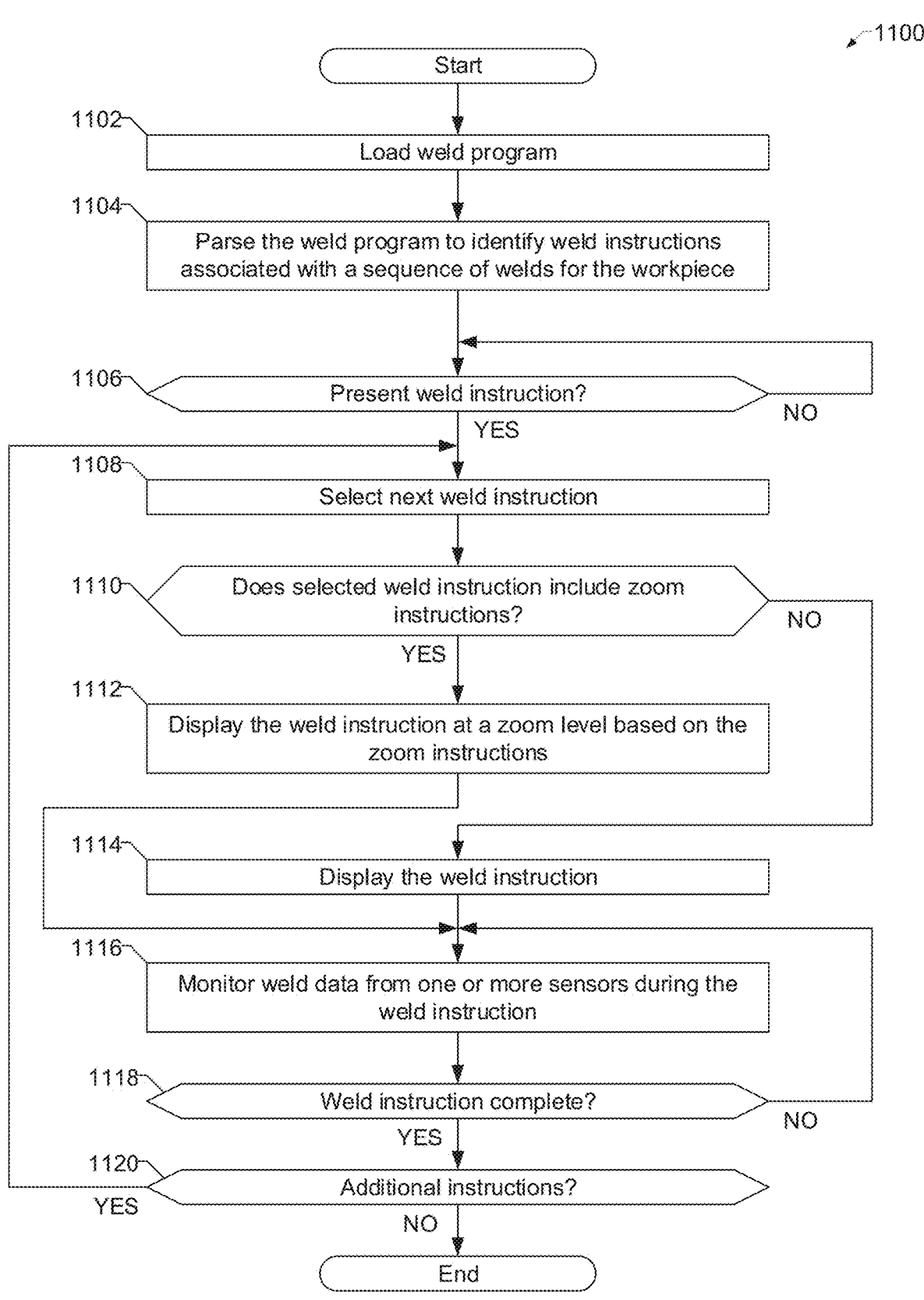

FIG. 11 is a flowchart representative of example machine readable instructions 1100 which may be executed to implement the computing device 10 and/or the computing system 200 of FIGS. 1 and/or 2 to present a weld program to an operator. For example, the instructions 1100 may be used to implement the interface computing device 10 of FIG. 1.

At block 1102, the processor 202 (e.g., a processor of the computing device 10) loads a weld program. The weld program may be selected by a weld operator or automatically selected based on sensor data. At block 1104, the computing device 10 parses the weld program to identify weld instructions associated with a sequence of welds. For example, the computing device 10 may identify the weld instructions and components of the weld program.

At block 1106, the processor 202 determines whether a weld instruction is to be presented (e.g., via the computing device 10 of FIG. 1). For example, weld instructions may be presented in response to clamping of a part, completion of a prior weld instruction, resuming of a weld operation following a break, and/or any other event. If a weld instruction is not to be presented (block 1106), control iterates to block 1106 until a weld instruction is to be presented. In some examples, the processor 202 continues displaying a current weld instruction or interface while waiting for a subsequent weld instruction at block 1106.

When a weld instruction is to be presented (block 1106), at block 1108 the processor 202 selects a next weld instruction in the weld instructions. For example, the processor 202 may select a next weld instruction in a sequence of instructions, and/or may select a weld instruction based on an event or other input causing a branch from a sequence of instructions. At block 1110, the processor 202 determines whether the selected weld instruction includes zoom instructions. For example, a weld instruction and/or the weld program may specify a zoom level as described above via metadata, or via a specified property of a particular weld instruction, shape, or other component. The zoom level may be selected from predefined levels (e.g., zoom to predefined level 1, predefined level 2, slide level, etc.) and/or dynamically defined (e.g., specified using components of the slide, coordinates, etc.) by the weld instruction or weld program.

If the selected weld instruction includes zoom instructions (block 1110), at block 1112 the processor 202 displays the weld instruction at a zoom level based on the zoom instructions. For example, the processor 202 may display a visual slide on which the weld instruction is located at the specified zoom level. Conversely, if the selected weld instruction does not include zoom instructions (block 1110), at block 1114 the processor 202 displays the weld instruction. The display of the weld instruction without zoom instructions may use the most recent zoom level, no zoom level, a default zoom level, and/or any other zoom instructions. In block 1112 or 1114, the processor 202 may display one or more slides, parts, weld indicators, and/or any other data defining the weld instruction via the computing device 10.

After displaying the weld instruction (block 1112 or block 1114), at block 1116 the processor 202 monitors weld data from one or more sensors. For example, the processor 202 may monitor sensors, digital interfaces, and/or any other weld data monitoring devices during the weld.

At block 1118, the processor 202 determines whether the weld instruction is complete. For example, the processor 202 may determine whether the end of a weld is detected, or any other indication that a weld instruction is complete. If the weld instruction is not complete (block 1118), control returns to block 1116 to continue monitoring. When the weld instruction is complete (block 1118), at block 1120 the processor 202 determines whether there are additional weld instructions in the weld program. If there are additional weld instructions (block 1120), control returns to block 1108. When there are no more weld instructions (block 1120), the instructions 1100 end.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A system for generating weld instructions for welding of components of a workpiece, the system comprising:
a processor configured to:
receive a video input of a welding process;
identify one or more features associated with the welding process based on the video input;
search a library for the one or more identified features;
identify an activity related to the workpiece based on the one or more identified features;
determine an activity location of the activity based on the one or more identified features;
generate one or more welding instructions based on the activity and the activity location; and
display the welding instructions.

2. The system of claim 1, further comprising one or more sensors configured to collect data associated with the welding process and provide the data to the processor, and wherein the processor is configured to identify the one or more features based at least in part on the data.

3. The system of claim 2, wherein the one or more sensors are at least one of a voltage sensor, a current sensor, a wire speed sensor, a brightness sensor, or a clamping sensor.

4. The system of claim 1, wherein the activity location is a location of a weld on the workpiece.

5. The system of claim 1, wherein the weld instructions comprise one or more visual slides, and the processor is further configured to present the one or more visual slides to a user.

6. The system of claim 5, wherein the processor is further configured to display a first portion of the one or more visual slides at a first zoom level obtained from a previously designed slide or series of slides, the previously designed slide or series of slides including zoom instructions that include the first zoom level.

7. The system of claim 6, wherein the processor is further configured to display a second portion of the one or more visual slides at a second zoom level different than the first zoom level obtained from the previously designed slide or series of slides, the previously designed slide or series of slides including zoom instructions that include the second zoom level.

8. The system of claim 1, wherein the activity comprises a fitting activity, a clamping activity, a welding activity, a cleaning activity, a maintenance activity, or a consumable replacement activity.

9. The system of claim 8, wherein the activity comprises the welding activity.

10. A non-transitory machine readable medium for generating weld instructions for welding of components of a workpiece, comprising machine readable instructions which, when executed, cause a processor to:
receive a video input of a welding process;
identify one or more features associated with the welding process based on the video input and data associated with the welding process that is collected by one or more sensors, the one or more sensors comprising at least one of a voltage sensor, a current sensor, a wire speed sensor, a brightness sensor, or a clamping sensor;
search a library based on the one or more identified features;
identify a welding activity or welding component related to the workpiece based on the one or more identified features;
determine a location of the welding activity or the welding component relative to the workpiece; and
generate one or more welding instructions based on the location of the welding activity or the welding component.

11. The non-transitory machine readable medium of claim 10, wherein the location of the welding activity or the welding component is a location of a weld on the workpiece.

12. The non-transitory machine readable medium of claim 10, wherein the weld instructions comprise one or more visual slides, and the processor is further configured to present the one or more visual slides to a user.

13. The non-transitory machine readable medium of claim 12, wherein the one or more visual slides are edited based on user input.

14. The non-transitory machine readable medium of claim 12, wherein the processor is further configured to store the one or more visual slides for later retrieval.

15. The non-transitory machine readable medium of claim 12, wherein the processor is further configured to display a first portion of the one or more visual slides at a first zoom level obtained from a previously designed slide or series of slides, the previously designed slide or series of slides including zoom instructions that include the first zoom level.

16. The non-transitory machine readable medium of claim 15, wherein the processor is further configured to display a second portion of the one or more visual slides at a second zoom level different than the first zoom level, the second zoom level being obtained from the previously designed slide or series of slides, the previously designed slide or series of slides including zoom instructions that include the second zoom level.

17. A system for generating weld instructions for welding of components of a workpiece, the system comprising:
one or more sensors configured to collect data associated with a welding process, the one or more sensors comprising at least one of a voltage sensor, a current sensor, a wire speed sensor, a brightness sensor, or a clamping sensor;
a processor configured to:
receive the data collected by the one or more sensors;
receive a video input of the welding process;
identify one or more features associated with the welding process based on the video input and the data collected by the one or more sensors;
search a library for the one or more identified features;
identify a welding activity or welding component related to the workpiece based on the one or more identified features;
determine a location of the welding activity or the welding component relative to the workpiece and based on the one or more identified features; and generate one or more welding instructions based on the welding activity or the welding component and the location of the welding activity or the welding component.

18. The system of claim 17, wherein the weld instructions comprise one or more visual slides, and the processor is further configured to present the one or more visual slides to a user.

19. The system of claim 18, wherein the processor is further configured to display a first portion of the one or more visual slides at a first zoom level obtained from a previously designed slide or series of slides, the previously designed slide or series of slides including zoom instructions that include the first zoom level.

20. The system of claim 19, wherein the processor is further configured to display a second portion of the one or more visual slides at a second zoom level different than the first zoom level obtained from the previously designed slide or series of slides, the previously designed slide or series of slides including zoom instructions that include the second zoom level.

* * * * *